(12) United States Patent
Hirata et al.

(10) Patent No.: US 6,201,284 B1
(45) Date of Patent: *Mar. 13, 2001

(54) MULTI-AXIS ACCELERATION SENSOR AND MANUFACTURING METHOD THEREOF

(75) Inventors: Yoshiaki Hirata; Masahiro Tsugai; Nobuaki Konno, all of Tokyo (JP)

(73) Assignee: Mitsubishi Denki Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/025,247
(22) Filed: Feb. 18, 1998

(30) Foreign Application Priority Data

Aug. 8, 1997 (JP) .................................................... 9-215075

(51) Int. Cl.[7] ............................. H01L 29/82; H01L 21/00
(52) U.S. Cl. ........................... 257/415; 257/417; 438/50; 438/52
(58) Field of Search .................................... 257/414, 415, 257/417–420; 438/50, 52

(56) References Cited

U.S. PATENT DOCUMENTS

| | | | |
|---|---|---|---|
| 4,538,461 | * 9/1985 | Juptner et al. | 73/505 |
| 5,233,213 | * 8/1993 | Marek | 257/415 |
| 5,461,916 | * 10/1995 | Fujii et al. | 73/514.32 |
| 5,500,549 | * 3/1996 | Takeuchi et al. | 257/415 |
| 5,627,318 | * 5/1997 | Fujii et al. | 73/514.32 |
| 5,734,105 | * 3/1998 | Mizukoshi | 73/504.02 |
| 5,872,024 | * 2/1999 | Fujii et al. | 438/52 |
| 5,914,520 | * 6/1999 | Werner | 257/415 |

FOREIGN PATENT DOCUMENTS 8-32090   2/1996  (JP) .

* cited by examiner

*Primary Examiner*—Mahshid Saadat
*Assistant Examiner*—Allan R. Wilson
(74) *Attorney, Agent, or Firm*—McDermott, Will & Emery (57) ABSTRACT

A movable electrode structure is formed in a single sensor element, and this movable electrode structure can be displaced along two axes within a plane, and one axis outside the plane. A detecting fixed electrode is provided via a constant space with each of these detecting axes, and a change in capacitances between the movable electrodes and the fixed electrodes is detected. As a result, the acceleration components of the two axes, or the three axes are detected. The dynamic characteristic of the sensor is controlled based on the mass of the variable electrode, the structure and length of the beam for supporting the movable electrode, and also the ratio of the length to the section of this beam.

12 Claims, 9 Drawing Sheets

MULTI-AXIS ACCELERATION SENSOR AND MANUFACTURING METHOD THEREOF

BACKGROUND OF THE INVENTION

1. Field of the Invention

The present invention is related to a capacitance detecting type acceleration sensor and a manufacturing method thereof, capable of simultaneously measuring acceleration along either two axes or three axes, applicable to a vibration measurement, a vehicle control, and a motion control.

2. Description of Related Art

As sensors for detecting acceleration applied to a moving object, there are various sorts of sensors such as piezoelectric type sensors, distortion gauge type sensors, magnetic type sensors for using differential transformers, and capacitance type sensors for detecting capacitance changes in capacitors. Very recently, especially, as the acceleration sensors with utilizing the micromachining technique in the semiconductor field, a great attention is paid to the acceleration sensors with using the piezoelectric effect, the electric resistance value of which is varied in response to external mechanical force, and the acceleration sensor for calculating the acceleration by detecting changes in the capacitors. These sensors own various merits such as compactness of devices, mass-productivity, higher precision, and higher reliability. In particular, the acceleration sensor for electrically detecting the acceleration based on the changes in the capacitance value of the capacitor is disclosed in, for example, J-P-A 8-32090 (J-P-A: Japanese Patent unexamined publication).

Figure 9A:
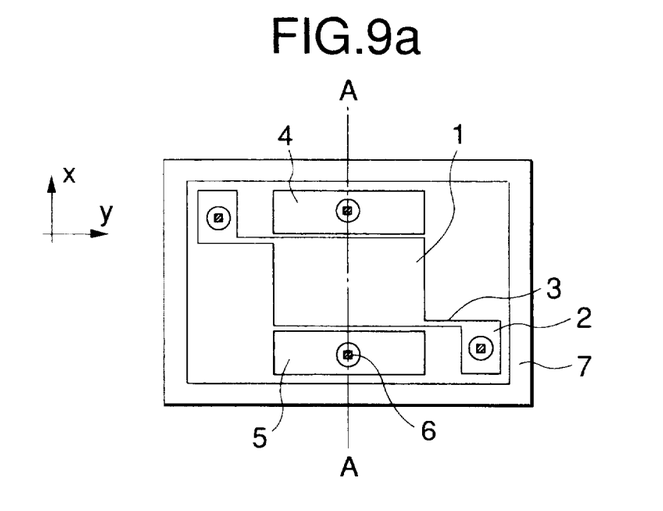
FIGS. 9(a) and 9(b) are explanatory diagrams for showing one example of the conventional capacitance type acceleration sensor.
Figure 9B:
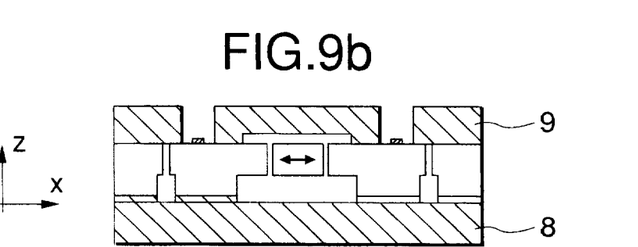
Figure 10:
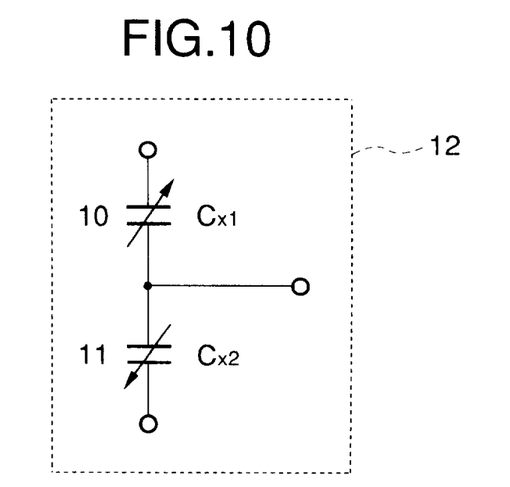
FIG. 10 is an explanatory diagram for showing one example of the conventional capacitance type acceleration sensor.

FIG. 9 is an explanatory diagram for showing an example of the conventional capacitance type acceleration sensor described in J-P-A 8-32090. FIG. 9(a) is a plan view, and FIG. 9(b) is a sectional view. The variable electrode 1 corresponding to the silicon mass body is supported via the beam 3 by an anchor portion 2. The fixed electrodes 4 and 5b are formed with defining a constant space on the side surface of this mass body. The capacitors 10 and 11 are formed by the mass body 1 and the fixed electrodes 4 and 5b. As seen from the A—A sectional view of FIG. 9, the sensor structure containing these auxiliary supporting unit 7 is jointed to the glass substrate 8a and the glass substrate 9b by the anode jointing method, and the region used to form the capacitors is hermetically sealed. These capacitors 10 and 11 constitute the sensor element 12. When inertial force caused by acceleration is exerted along the x-direction of the mass body 1, the mass body 1 is displaced along the x-direction. One electric capacitance defined between the mass body 1 and the fixed electrodes 4, 5 is increased ($C \times 1 = C + \Delta C$) by the displacement, whereas the other capacitance defined between the mass body 1 and the fixed electrodes 4, 5 is decreased ($C \times 2 = C - \Delta C$) by the displacement.

This capacitance change is converted into the voltage output by the IC-formed detecting chip (ASIC), so that this acceleration can be derived as the voltage output. This IC-formed detecting chip owns the capacitance-to-voltage converting circuit having:

$$\text{Vout} = C \times 1/(C \times 1 + C \times 2) \cdot Vs$$

In this formula, symbol "Vout" indicates the voltage output, and symbol "Vs" shows the input voltage.

In the case that the above-described acceleration sensor, this acceleration sensor is limited to the acceleration measurement of the one axial direction (x direction). Accordingly, when the acceleration along the two axial directions, or the three axial directions is measured, two sets of the sensor elements and of the ASICs are required, so that the dimension of the package for storing the sensor elements and the ASICs is increased. Therefore, there is a problem that the manufacturing cost is increased.

SUMMARY OF THE INVENTION

The present invention has been made to solve the above-described conventional problems, and has an object to provide a low-cost multi-axis acceleration sensor and a manufacturing method thereof, capable of measuring acceleration along either two axial directions or three axial directions.

A first aspect of the present invention is a multi-axis acceleration sensor for detecting acceleration along directions of plural axes of the present invention which comprises:

at least one mass body made of a single crystal silicon wafer and arranged within a plane of said silicon wafer;

at least two cantilever beams arranged in parallel to each other, capable of displacing said mass body along a plurality of directions and of holding said mass body in such a manner that vibration forms of said mass body are defined to be parallel moved along said wafer plane direction;

at least one fixed electrode which is electrically insulated from said cantilever beams and said mass body, and is arranged each direction, opposite to each other via a constant space every acceleration detecting direction of said each mass body so as to detect displacement of said mass body caused by the acceleration along the plural directions; and displacement detecting means for detecting the displacement of said mass body by applying a constant voltage between said fixed electrode and said mass body.

A second aspect of the present invention is the multi-axis acceleration sensor according to the first aspect of the present invention, wherein:

the mass body comprises two mass bodies are arranged within said wafer plane in such a manner that said cantilever beams are positioned perpendicular to each other;

said fixed electrode is arranged opposite to said mass body along the acceleration detecting direction within said wafer plane; and the acceleration along the two axial directions within said wafer plane is detected.

A third aspect of the present invention is the multi-axis acceleration sensor according to the first aspect of the present invention, wherein:

first and second mass bodies are arranged within said wafer plane in such a manner that said cantilever beams are positioned perpendicular to each other; and said fixed electrode contains a first fixed electrode arranged opposite to said first mass body along the acceleration detecting direction within said wafer plane, and a second fixed electrode arranged opposite to said second mass body along an acceleration detecting direction outside said wafer plane; whereby:

a detection is made of the acceleration of two axes along the detection directing within the wafer plane, and of one axis along the detecting direction outside the wafer plane.

A fourth aspect of the present invention is the multi-axis acceleration sensor according to the first aspect of the present invention, wherein wherein a multi-axis acceleration detecting sensor is comprised of: a mass body "a" displaced with respect to one axis within the wafer plane, and a beam structure holding this mass body "a"; an edge portion of this beam structure is connected to a mass body "b" formed at a peripheral portion of the mass body "a"; in which the beam structure for holding the mass body "b" owns such a structure that the beam structure is displaced perpendicular to a displacement direction of the mass body "a"; more than one fixed electrodes are provided via a constant space and positioned opposite to the acceleration detecting directions within the wafer plane of the respective mass bodies; and the respective fixed electrodes are electrically insulated from the beam and the mass bodies to thereby detect the acceleration of two axes along the detecting directions within the wafer plane.

According to a fifth structure of the present invention, a multi-axis acceleration detecting sensor is comprised of: a mass body "a" displaced with respect to one axis within the wafer plane, and a beam structure holding this mass body "a"; an edge portion of this beam structure is connected to a mass body "b" formed at a peripheral portion of the mass body "a"; in which the beam structure for holding the mass body "b" owns such a structure that the beam structure is displaced perpendicular to a displacement direction of the mass body "a"; an edge portion of a beam of the mass body "b" is connected to amass body "c" formed at a peripheral portion of the mass body "b"; a beam structure for holding the mass body "c" owns a structure displaced along the detecting direction outside the plane; more than one fixed electrodes are provided via a constant space and positioned opposite to the acceleration detecting directions within the wafer plane of the respective mass bodies; and the respective fixed electrodes are electrically insulated from the beam and the mass bodies to thereby detect the acceleration of two axes along the detecting directions within the wafer plane, and also one axis along the detecting direction outside the wafer plane.

According to a sixth structure of the present invention, a multi-axis acceleration detecting sensor is comprised of: a mass body "a" displaced with respect to one axis outside the wafer plane, and a beam structure holding this mass body "a"; an edge portion of this beam structure is connected to a mass body "b" formed at a peripheral portion of the mass body "a"; a beam structure for holding a mass body "b" is such a structure displaced with respect to one axis within the wafer plane, a beam edge portion of the mass body "b" is connected to a mass body "c" formed at a peripheral portion of the mass body "b"; a beam structure for holding the mass body "c" owns such a displacement structure positioned perpendicular to the displacement direction of the mass body "b" within the wafer plane; more than one fixed electrodes are provided via a constant space and positioned opposite to the acceleration detecting directions within the wafer plane of the respective mass bodies; and the respective fixed electrodes are electrically insulated from the beam and the mass bodies to thereby detect the acceleration of two axes along the detecting directions within the wafer plane, and also the acceleration of one axis along the detecting direction outside the wafer plane.

According to a seventh structure of the present invention, a multi-axis acceleration detecting sensor is featured by that: a self-diagnostic actuation electrode is provided with one axis, two axes, or three axes of the acceleration detecting direction.

According to an eighth structure of the present invention, a multi-axis acceleration detecting sensor is featured by that: a comb-shaped overlap is provided at a portion where the mass bodies are located opposite to the electrode in at least one of the detecting electrode along the detecting direction within the plane, and an actuation electrode.

According to a ninth structure of the present invention, a multi-axis acceleration detecting sensor is featured by that: as to the detection electrode along the detecting direction within the wafer plane, or an actuation electrode, otherwise the detection electrode and the actuation electrode, the mass bodies are made of hollow slit structures, and electrodes are provided in the hollow slit structures.

A tenth aspect of the a multi-axis acceleration detecting sensor is an acceleration detecting sensor according to the first aspect of the present invention, wherein the fixed electrode is made of a conductive layer formed on insulating substrates by which the silicon wafer is sandwiched so that a clearance between the fixed electrode and the mass body is determined by the depth of the groove formed on the silicon wafer.

According to a tenth structure of the present invention, a multi-axis acceleration detecting sensor is comprised of:

a step in which an acceleration sensor structure is made of a three-layer sealing structure by a silicon substrate having either glass or an insulating film; a step in which an IC-formed detecting circuit is provided at an upper portion of the sensor element, or a peripheral portion thereof; a step in which a supporting portion for surrounding a peripheral portion of the acceleration sensor structure is provided; and a step in which both the sensor element and the detecting circuit are hermetically sealed by a package.

PREFERRED EMBODIMENT OF THE INVENTION

Embodiment 1

Figure 1A:
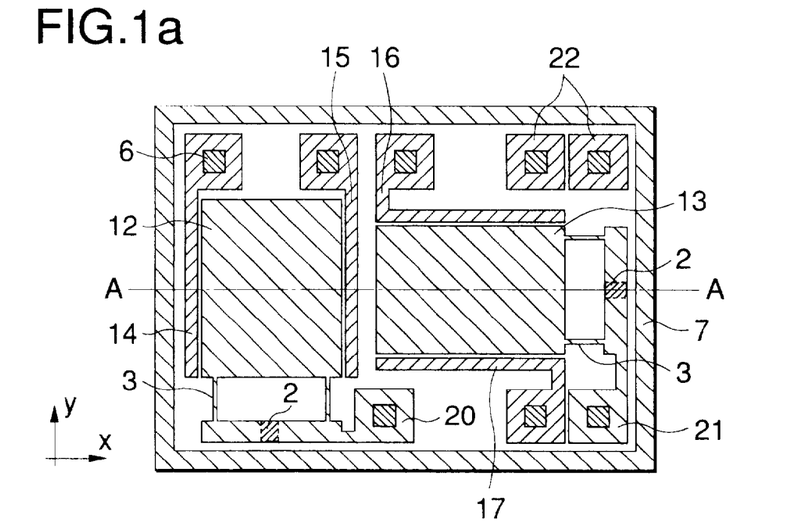
FIGS. 1(a)–1(c) are structural diagrams for showing a structure of a multi-axis acceleration sensor according to an embodiment 1 of the present invention.
Figure 1B:
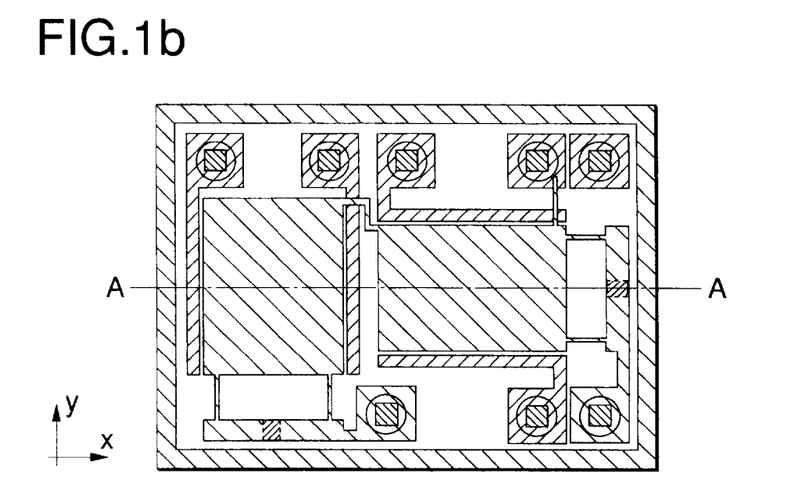
Figure 1C:
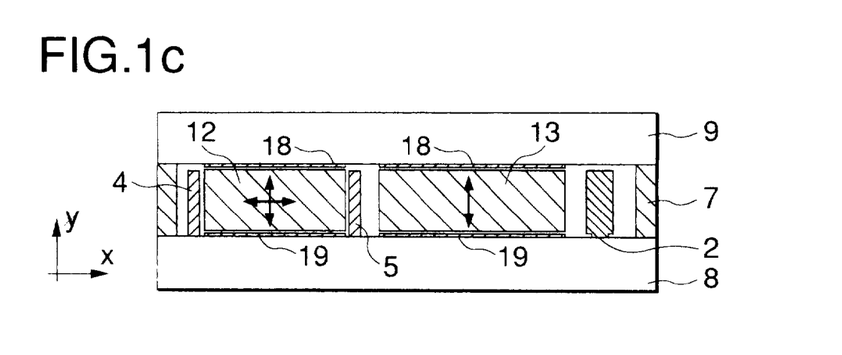

FIGS. 1(a)–1(c) are structural diagrams for showing a structure of an embodiment 1 according to the present invention, and represents a front view of an acceleration sensor element capable of detecting 3-axis acceleration, and a sectional view of this acceleration sensor element, taken along a line A—A. In the drawing, the plan view (a) is such a plan view from which a glass substrate b9 has been omitted, and the plan view (b) is such a plan view in which the glass substrate b9 is jointed. The 3-axis acceleration sensor shown in FIGS. 1(a)–(c) is a sensor system for detecting 3-axis acceleration by arranging two sensor elements for detecting acceleration of 1 axis along a detecting direction within a plane parallel to a substrate, and acceleration of a normal line (z) direction of this substrate. A mass body 12 is jointed via a beam 3 to a glass substrate a8 at an anchor portion 2. A fixed electrode a14 and a fixed electrode b15 are provided with making a constant space at a plane located opposite to the mass body 12 along an x-axis direction. These fixed electrodes a14 and a15 constitute a capacitor Cx1(10) and a capacitor Cx2(11) shown in FIG. 2. The mass body 12 has such a structure that this mass body 12 is displaced by acceleration applied thereto along the x-axis direction and the z-axis direction. On the other hand, a mass body 13, a fixed electrode c16, and a fixed electrode d17 own such structures that the mass body 12, the fixed electrode c14 and the fixed electrode b15 are rotated by 90 degrees. The mass body 13, the fixed electrode c16, and the fixed electrode d17 form a capacitor Cy1(23) and another capacitor Cy2(24) indicated in FIG. 4. The mass body 13 is displaced by acceleration applied thereto along a y-axis direction and the z-axis direction.

Figure 2:
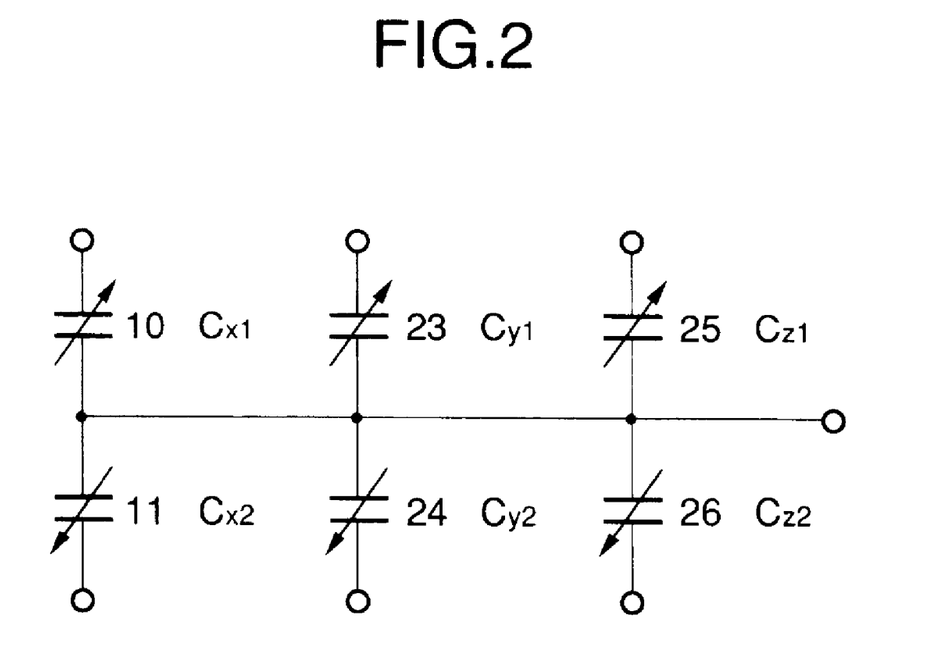
FIG. 2 is an electric equivalent circuit diagram of the embodiment 1 of the present invention.

When the acceleration is applied along the x-axis direction within the plane in the plan view of FIG. 1(a), the mass body 12 is displaced along the x-axis direction, so that the electric capacitances of the capacitors Cx1(10) and Cx2(11) indicated in FIG. 2 are changed. On the other hand, since the mass body 13 owns high rigidity along the x-axis direction, this mass body 13 is not displaced with respect to the acceleration along the x-axis direction. Similarly, when the acceleration is applied along the y-axis direction, the mass body 13 is displaced along the y-axis direction, so that the electric capacitances of the capacitors Cy1(23) and Cy2(24) indicated in FIG. 2 are changed. These capacitance changes are converted into voltage outputs through a signal processing circuit, so that the two-axis acceleration of the directions (X, Y) within the plans can be detected.

In the plan view of FIG. 1(b) and the A—A sectional view of FIG. 1(c), a fixed electrode 18 and a fixed electrode 19 are provided on the glass substrate a8 and the glass substrate b9 via a constant space above/below the mass body 12 and the mass body 13, which constitute a capacitor Cz1(25) and a capacitor Cz2(26) indicated in FIG. 2. The fixed electrode 18 and the fixed electrode 19 are electrically connected to an island electrode 22 for the fixed electrodes along the respective axes. When the acceleration is applied to both the mass body 13 and the mass body 13 along the z direction, the positions of these mass bodies are displaced, and therefore the electric capacitances of the capacitors Cz1(25) and Cz2(26) shown in FIG. 2 are changed. This capacitance change is converted into a voltage output via a signal processing circuit, so that the acceleration along the direction outside the plane (z axis) can be detected.

The respective fixed electrodes and an intermediate electrode are connected via electrode pads 6 to an external signal processing circuit by way of wire bonding. Similar to the sensor structure shown in FIG. 9, the sensor structure indicated in FIG. 1 is bonded to the glass substrate a8 and the glass substrate b9 by way of the anode jointing method, and the region where the capacitors are formed is hermetically sealed. As a result, neither the expensive metal package, nor the ceramic package are required which may prevent the destroys of the sensor element. But, the sensor element and the ASIC can be packaged by employing the low-cost plastic package used for the general-purpose IC. Accordingly, it is possible to manufacture the compact multi-axis acceleration sensor in low cost.

In FIGS. 1(a)–1(c), the beam structures 3 for supporting the mass body 12 and the mass body 13 are two sets of the cantilever beam structures. Alternatively, it is possible to employ more than one, namely plural beams. Alternatively, it is possible to employ a double cantilever beam structure as indicated in FIG. 9. The displacement amounts of the mass body with respect to the respective axes are determined by the rigidness of the beam, namely the length, width, and thickness of the beam. When the rigidness of the beam for the displacement along the detecting direction within the plane (x, y axes) is set to be substantially equal to that for the displacement along the detecting direction outside the plane (z axis), there is a possibility that the beam is displaced also along the detecting direction outside the plane (or within the plane) by the acceleration applied along the detecting direction within the plane (or outside the plane), and thus the independent characteristic in the sensitivity is lost. As a consequence, the dimension of the beam is controlled, so that the rigidness along the detecting direction within the plane must be different from the rigidness along the detecting direction outside the plane.

In the sensor structure shown in FIGS. 1(a)–(c), the rigidness of the beam for supporting the mass body 12 is made equal to that for supporting the mass body 13 along the z-axis direction, and also the fixed electrode of the mass body 12 for the z-axis detection is made equal to the fixed electrode of the mass body 13 for the z-axis detection. When the rigidnesses are different from each other, the fixed electrode 18 and the fixed electrode 19 may be provided above/under one of these mass bodies.

Otherwise, the fixed electrodes for the detecting direction outside the plane may be provided above/under the respective mass bodies, and thus the displacement along the z-axis direction may be independently detected by each of these mass bodies. In such a case that the z-axis displacement is separately detected by each of these mass bodies, another set of z-axis detecting capacitor is further added to the capacitor structure shown in FIG. 2.

Alternatively, it is possible to detect the acceleration in higher precision over a wide acceleration range if the displacement along the z-axis direction is independently detected by each of the mass bodies in such a manner that the rigidness of the beam 3 for supporting the mass body 12 along the z-axis direction is different from the rigidness of the beam 3 for supporting the mass body 13 along the z-axis direction.

In the sensor structure shown in FIGS. 1(a)–1(c), the acceleration detecting ranges for the three axes need not be made equal to each other, but the acceleration detecting ranges for the respective axes may be changed, depending on the use purposes, by adjusting the rigidness of the beam 3, namely the dimension of the beam 3. Also, when only the acceleration detections are required only for the two axes along the direction within the plane since the acceleration detections for the 3 axes are not required, the fixed electrode e18 and the fixed electrode 19 are merely omitted. In the case that only the acceleration detections are required for the 1 axis along the direction within the plane, and the 1 axis along the direction outside the plane, the mass body 13 and the fixed electrode c16 and the fixed electrode d17 located opposite to this mass body 13 may be omitted.

In the sensor structure of FIGS. 1(a)–1(c), since the sensor element is hermetically sealed by the upper/lower glass and then the fixed electrodes are separated by a properly dimensioned space along the movable direction of the mass body, even when the excessively large shock is applied thereto, the fixed electrodes can function as the stoppers. Therefore, this sensor structure is such a superior structure for the anti-shock characteristic.

FIGS. 3(a)–3(e) are an explanatory diagram for representing a method for manufacturing the multi-axis acceleration sensor according to the embodiment 1 according to the present invention. With employment of the photo lithography technique, the wet etching, or the dry etching, an etching groove a28 and another etching groove b29 are formed on a rear surface and a front surface of a silicon device wafer 27 (see FIG. 3a).

Figure 3A:
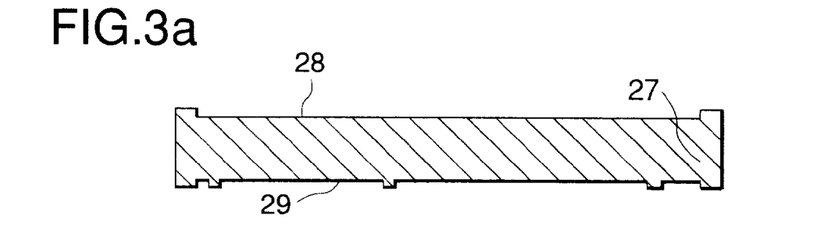
FIGS. 3(a)–3(e) are explanation diagrams for indicating a method for manufacturing the multi-axis acceleration sensor of the embodiment 1 of the present invention.

A depth of the etching groove is on the order of several micrometers (micron). This depth of the etching groove will constitute a space between the mass body and the fixed electrode for detecting the acceleration along the z-axis direction. After the etching grooves have been formed, impurity diffusion process may be carried out on the front/rear surfaces of the device wafer 27, so as to increase the conductivity of the device wafer 27.

Figure 3B:
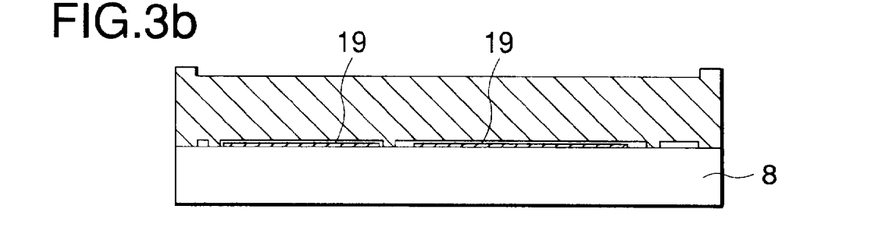
Figure 3C:
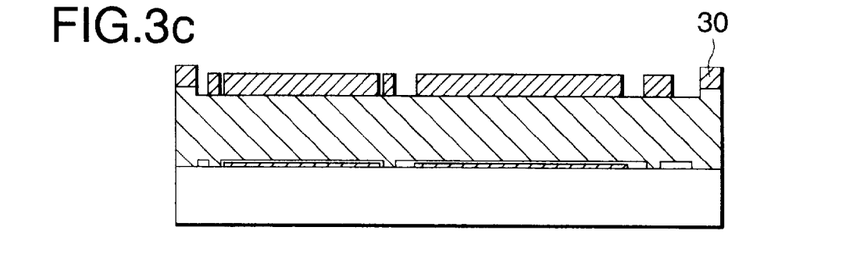
Figure 3D:
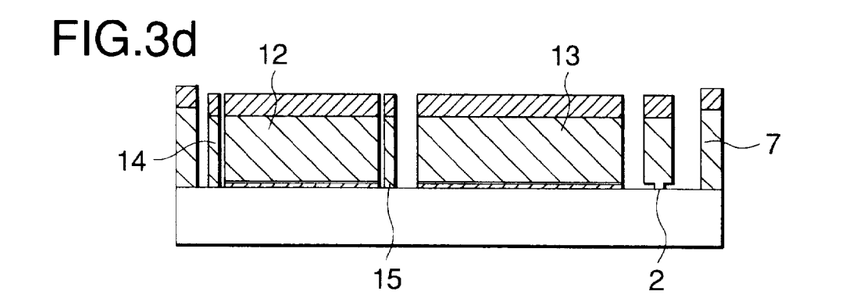
Figure 3E:
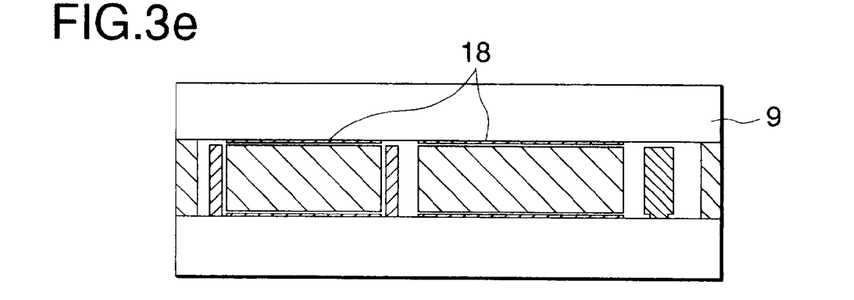

Next, the glass substrate a8 is jointed to the device wafer 27 by using the anode jointing method, and the fixed electrode 19 has been patterned on the surface of this glass substrate a8 by way of the photo lithography technique, the sputtering film forming technique, and the vapor deposition film forming technique (see FIG. 3b). As the material of the fixed electrode 19, any metals (Cr/Au etc.) may be employed which owns the close fitting characteristic with the glass, is not corroded by the dry etching (will be discussed later), and is not altered when being jointed to silicon. Also, the etching groove a28 may be formed after the device wafer 27 has been jointed to the glass substrate a8.

Next, a metal pad 6 (not shown) is formed on the device wafer 27 by using the photo lithography technique and the film forming technique. Thereafter, a photoresist is patterned on the device wafer 27 by using the photo lithography technique. The sensor structure is determined by this photoresist pattern (see FIG. 3c). While using the photoresist 27 as an etching mask, the device wafer 27 is vertically through-etched away by way of the high aspect ratio dry etching (see FIG. 3c). This dry etching process causes the mass bodies, the beams, and the fixed electrodes which constitute the major structural portion of this sensor to be formed. The etching mask of the dry etching process is not limited to the photoresist, but a patterned insulating film such as a silicon oxide film, and a metal film may be employed.

Subsequently, the glass substrate b9, on which surface the fixed electrode 18 has been previously formed, is jointed to the device wafer 27 by the anode joint method, so that the wafer manufacturing step is completed. Thereafter, the sensor chip is cut away by the dicing and then is jointed to the package. Then, the IC-formed detecting chip (ASIC) and the sensor chip are connected by the bonding wire. Although the ASIC is separately provided with the sensor chip, this ASIC may be jointed on the sensor chip by using the die bonder agent for compact purposes. As the package, a metal package, a ceramic package, and the like maybe used. Since the sensor chip is made by the hermetic sealing structure, low-cost plastic packages may be utilized.

In FIGS. 3(a)–3(e), the thickness of the device wafer 27 is directly used as that of the structural body. When the thickness of the structural body is desirably made thinner, after the device wafer 27 is jointed to the glass substrate a8 in FIG. 3b, the device wafer 27 may be polished to be etched away by employing the electrochemical etching process so as to make the thinner thickness thereof. In this case, after the thickness of the device wafer 27 has been adjusted, the etching groove a28 must be formed.

In FIG. 1 and FIG. 3, although the fixed electrodes within the plane and the anchor portion are not jointed to the upper glass substrate b9, they may be jointed to each other. In such a sensor structure that both the fixed electrodes within the plane and the anchor portion are jointed to the upper glass, the manufacturing order of the manufacturing method shown in FIG. 3 is changed, and the sensor device 27 and the glass substrate b9 may be jointed prior to the glass substrate a8.

In FIGS. 1(a)–1(c) and FIGS. 3(a)–3(e), as the space for detecting the acceleration along the z-axis direction, the device wafer 27 is processed to form the etching groove, as shown in FIG. 3(a). Alternatively, spaces may be formed in the glass substrate a8 and the glass substrate b9.

Figure 4:
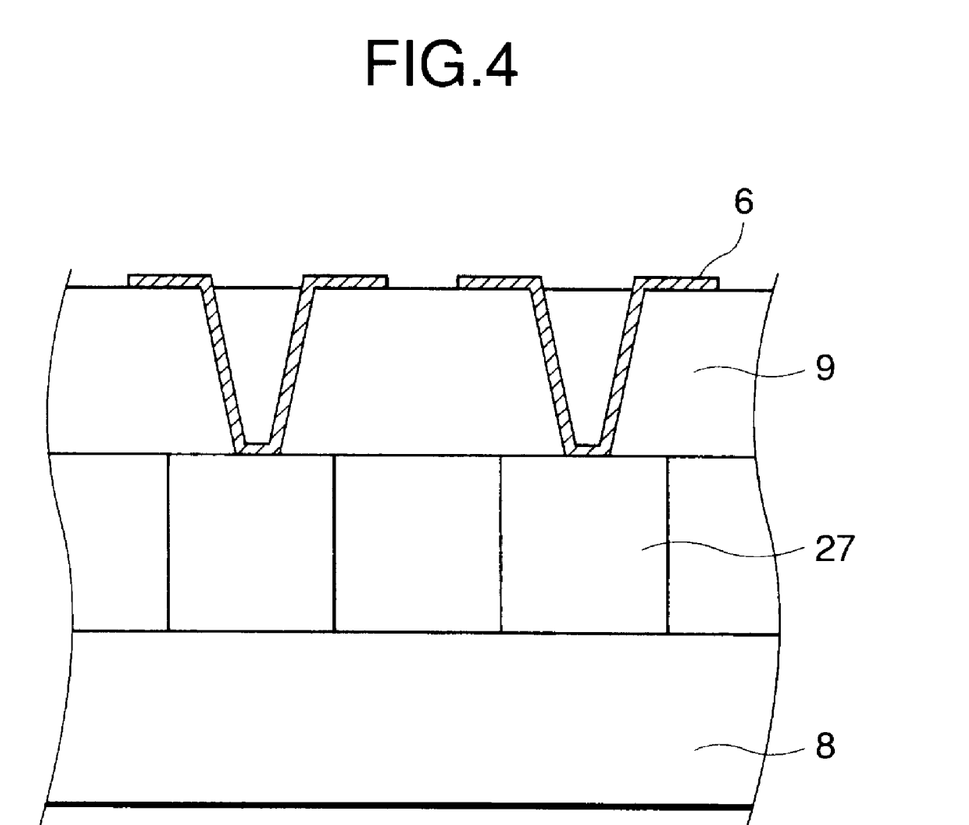
FIG. 4 is an explanatory diagram for representing a method for forming an electrode pad according to the manufacturing method of FIG. 3.

In the sensor structure shown in FIGS. 1(a)–1(c), after the electrode pad 6 has been formed on the device wafer 27, the glass substrate b9 is jointed thereto. Alternatively, as shown in FIG. 4, after the glass substrate b9 has been jointed, the electrode pad 6 may be formed. In FIG. 4, the electrode deriving hole of the glass substrate b9 is processed by making a proper taper form. After the device wafer 27 has been jointed to the glass substrate b9, a film of the metal pad 6 is patterned by using the metal mask and the like. The signal deriving wire bond is connected to the electrode pattern formed on the glass substrate b9. With employment of the electrode structure shown in FIG. 4, the electrode pattern of the device wafer 27 can be made compact, so that the sensor can be made more compact and in further low cost.

Although the glass is used as the upper/lower substrates for hermetically sealing the sensor structures in FIGS. 1(a)–1(c) and FIGS. 3(a)–3(e), a silicon substrate having an insulating film may be employed. When the silicon substrate is used, since the linear expansion coefficient of the sensor structure is the same as that of the upper/lower substrates, the change in the sensor characteristics for the ambient temperature can be reduced.

Embodiment 2

Figure 5A:
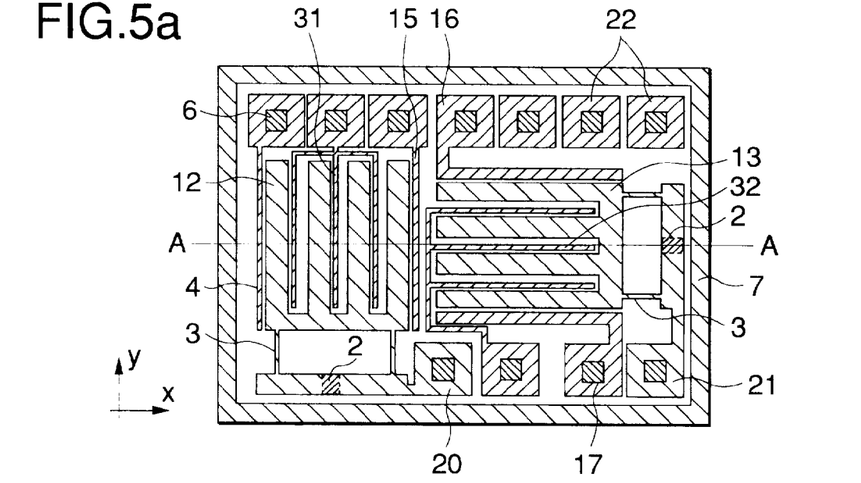
FIGS. 5(a)–5(c) are structural diagrams for indicating a structure of a multi-axis acceleration sensor according to an embodiment 2 of the present invention.
Figure 5B:
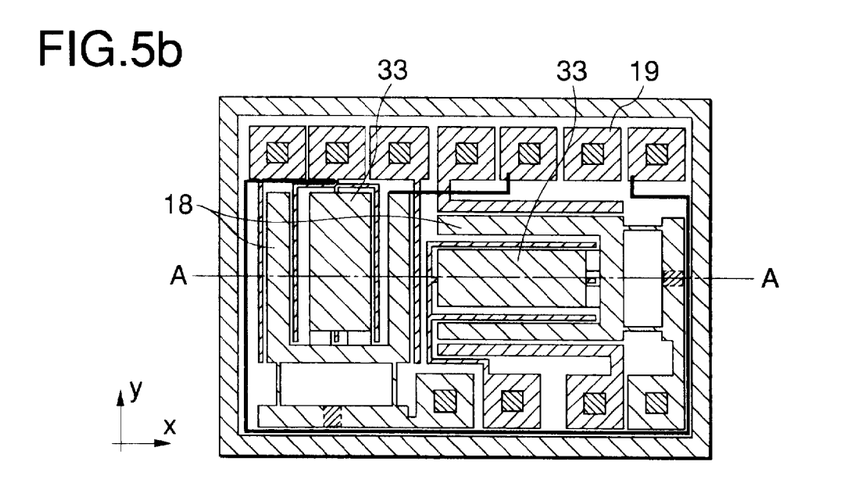
Figure 5C:
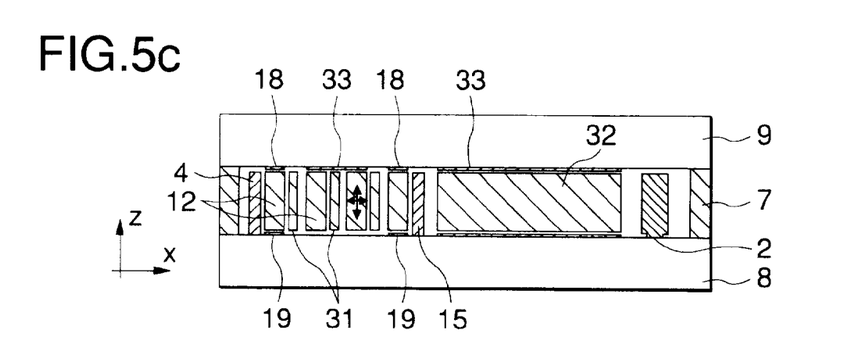

FIGS. 5(a)–5(c) are a structural diagram for representing a structure of a multi-axis acceleration sensor according to an embodiment 2 of the present invention. In this drawing, a plan view FIG. 5(a) is such a plan view from which the glass substrate b9 is removed, and another plan view FIG. 5(b) is a plan view in which the glass substrate b9 is jointed. A sensor structure of FIGS. 5(a)–5(c) is featured by that in the embodiment 1, the sensor structure shown in FIGS. 1(a)–1(c) is made in a comb shape, an actuation electrode a31 and another actuation electrode b32 are additionally employed, the electrode for detecting the acceleration along the z-axis direction is subdivided, and a further actuation electrode c33 is employed in addition to the detecting fixed electrode e18. The respective actuation electrodes are arranged in parallel to the fixed electrodes and in an equi-interval with a distance between the fixed electrodes and the mass bodies. Both the actuation electrode a31 and the actuation electrode b32 are jointed to the glass substrate a8. When a potential difference is applied between an intermediate electrode a20 and the actuation electrode a31, the mass body a12 is moved by the electrostatic attraction force in the direction of the actuation electrode a31. Since this move amount is detected as a change in electric capacitances between the fixed electrode a4, the fixed electrode b5, and the mass body 12, it is possible to achieve a self-diagnose of the sensor sensitivity along the x-axis direction.

Similarly, a potential difference is applied between the intermediate electrode b21 and the actuation electrode b32 so as to displace the mass body 13 along the y-axis direction, and a change in electric capacitances between the fixed electrode c16, the fixed electrode d17, and the mass body 13 is detected, so that a self-diagnose along the y-axis direction can be achieved. Also, a self-diagnose along the z-axis direction can be achieved by applying a potential difference between an intermediate electrode 18, an intermediate electrode b21, and an actuation electrode c33 so as to detect a change in electric capacitances between the fixed electrode 18, the fixed electrode 19, and the mass body 12. In FIGS. 5(a)–5(c), although the fixed electrode 18, the fixed electrode 19, and the actuation electrode c33 in the z-axis direction are identical to the mass body 12 and the mass body 13, they may be separated as indicated in the embodiment 1. Also, only the actuation electrodes are inserted into the comb-shaped structure of the mass body in FIGS. 5(a)–5(c). Alternatively, the detecting fixed electrode may be inserted into the comb-shaped structure so as to increase the detected capacitances. Also, the actuation electrodes are inserted into all of the 3 axes in FIGS. 5(a)–5(c). Alternatively, the actuation electrode may be inserted only into the detecting axis requiring the self-diagnose function, depending upon the use purposes.

A method for manufacturing the sensor structure shown in FIGS. 5(a)–5(c) can be realized by the manufacturing method shown in FIGS. 3(a)–3(e) in the embodiment 1. Since the actuation electrode is inserted into each of the detecting axes, the self-diagnose function can be realized, resulting in the highly reliable acceleration sensor.

Embodiment 3

Figure 6A:
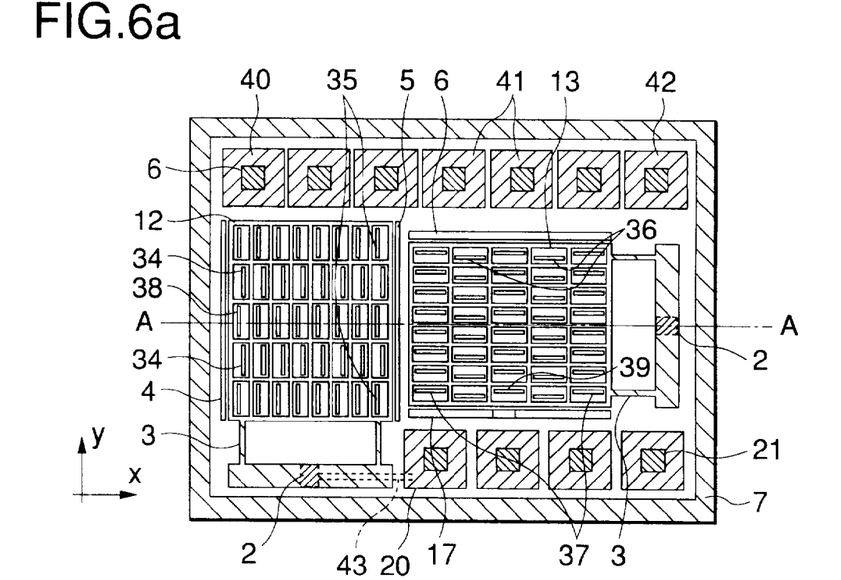
FIGS. 6(a)–6(c) are a structural diagram for indicating a structure of a multi-axis acceleration sensor according to an embodiment 3 of the present invention.
Figure 6B:
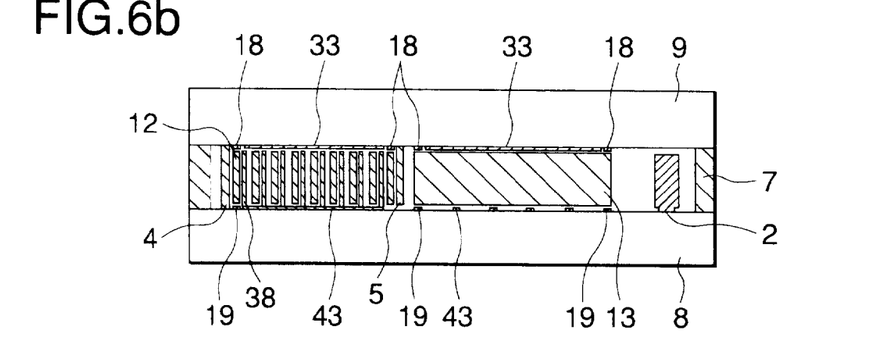
Figure 6C:
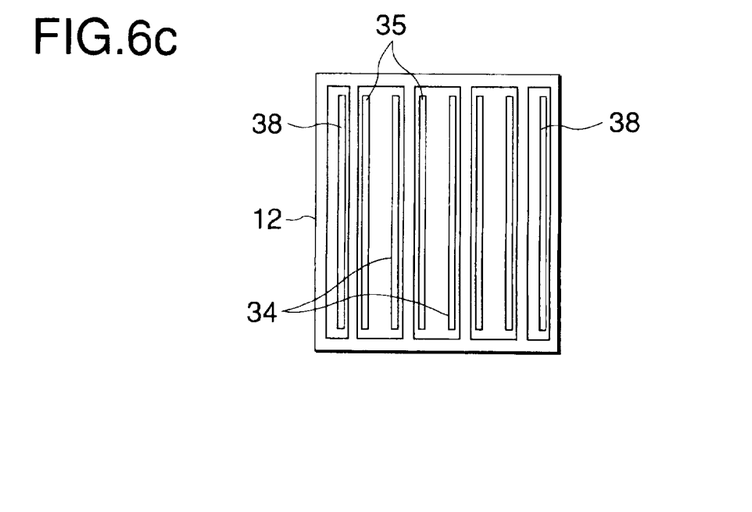

FIGS. 6(a)–6(c) is a structural diagram for representing a structure of a multi-axis acceleration sensor according to an embodiment 3 of the present invention. In this drawing, a plan view FIG. 6(a) is such a plan view from which the glass substrate b9 is removed, FIG. 6(b) is a sectional view, taken along a line A—A of the above-described plan view FIG. 6(a), and FIG. 6(c) is a sectional view of another buried electrode structure of the embodiment. A sensor structure of FIGS. 6(a)–6(b) is featured by that a hollow slit is formed in a mass body to thereby form a buried electrode. That is, a buried electrode a34 is formed in a hollow slit of the mass body 12, and both a buried electrode b35 and an actuation buried electrode a38 are formed in a hollow slit of the mass body. Similarly, a buried electrode a36 is formed in a hollow slit of the mass body 13, and both a buried electrode d37 and an actuation buried electrode b39 are formed in a hollow slit of the mass body. The respective buried electrodes are jointed to the glass substrate a8, and is electrically connected thereto by an underlayer metal wiring line formed on the buried electrode b34. The buried electrode b35 is electrically connected to the fixed electrode b5 by the underlayer metal wiring line 43. The buried electrode c36 is electrically connected to the fixed electrode c6, and the buried electrode d37 is electrically connected to the fixed electrode d7. The fixed electrodes 4, b5, c6, d7 are electrically connected to one of island electrodes 40, respectively, by the underlayer metal wiring line 43. Otherwise, similar to the sensor structure of FIGS. 5(a)–5(c), these fixed electrodes may be electrically connected to the island electrodes 40 by way of a silicon structural body. The buried electrodes 38 and 39 for the actuation purpose are electrically connected to any one of the island electrodes 40 by the underlayer metal wiring line 43.

The buried electrodes and the mass bodies are arranged in such a manner that one surface (surface along detecting direction) of the buried electrode is made equal to the space between the fixed electrode and the mass body, whereas the other surface thereof owns a sufficiently large space with respect to another surface. For instance, in FIG. 6(a), the buried electrode a34 is made in such a manner that a right-sided space is equal to a distance between the fixed electrode and the mass body, and a left-sided space is made sufficiently larger (for example, more than 10 times) than the right-sided space. A summation of a capacitance between the mass body 12 and the fixed electrode b5, and another capacitance between the mass body 12 and the buried electrode a34 corresponds to the capacitance Cx1(10) in FIG. 2. Since the detecting capacitance is constituted by employing the buried electrode, the initial capacitance can be considerably increased by employing the same chip area. Thus, it is possible to manufacture the capacitance detecting type acceleration sensor with the better S/N ratio. Although the fixed electrodes 4 to 7 are provided in FIGS. 6(a)–6(b), these fixed electrodes may be omitted and only the buried electrodes may constitute the detecting electrodes. Also, as shown in FIG. 6(c), the buried electrode a34 and the buried electrode b35 may be provided in a single hollow slit.

In the sensor structures indicated in FIGS. 9(a)–9(b), FIGS. 1(a)–1(c) and FIGS. 5(a)–5(c), when the ambient temperature is varied, distortion is produced in the silicon structural body, which is caused by the difference in the linear expansion coefficients between the glass substrate and silicon. Therefore, there are possibilities that the sensitivity is changed by the temperature variation, and the offset is changed by the temperature variation. In the sensor structure represented in FIGS. 6(a)–6(c), the buried electrode a34, the buried electrode b35, the buried electrode c36, and the buried electrode d37 are constituted by a large number of detecting electrodes are symmetrically arranged with respect to a symmetrical axis of the mass body (namely, center axis parallel to slit), and further are arranged along the displacement direction of the mass body. As a consequence, there is a difference between thermal expansion of the glass substrate and thermal expansion of the mass body in conjunction with a change in the ambient temperatures. Even when the position within the plane is slightly shifted, since the capacitance changes caused by the positional shifts of the mass body can be canceled to each other, this sensor structure is very stable with respect to the temperature change.

In the comb-shaped sensor structure shown in FIGS. 5(a) 5(c), if the comb-shaped structures of the mass bodies are made narrower in order to increase the electric capacitance, then the comb-shaped structures theirselves are locally moved upon receipt of the acceleration. Thus, there is such a risk that since this local movement is superimposed with the overall movement of the mass bodies, the movement of these mass bodies cannot be correctly measured. As a result, there is a limitation when the comb-shaped structures are made narrower. In contradiction that, in the buried electrode type sensor structure shown in FIGS. 6(a)–6(b), even when this sensor structure is made very narrow, the rigidness thereof cannot be lost. Therefore, this buried electrode type sensor structure is not locally deformed, but the electric capacitance thereof can be easily increased. As a consequence, more compact sensor structures with high sensitivity can be obtained.

Both the fixed electrode for detecting the acceleration along the z-axis direction and the actuation electrode are similar to those of the sensor structure shown in FIGS. 5(a)–5(c). It should be noted that since the underlayer metal wiring line 43 is formed on the glass substrate a8 at the same time in the sensor structure of FIGS. 6(a)–6(b), such a pattern must be formed by that the fixed electrode 19 is not overlapped with the lower metal wiring line 43. In the case that the underlayer metal wiring line 43 intersects the fixed electrode like the fixed electrode b5 and the fixed electrode d1 shown in FIGS. 6(a)–6(b), a dimple is previously formed in the fixed electrode in order that the underlayer metal wiring line 43 is not short-circuited with this fixed electrode. A method for manufacturing the sensor structure shown in FIGS. 6(a)–6(b), may be realized by the manufacturing method shown in FIGS. 3(a)–3(e). The sensor structure shown in FIGS. 6(a)–6(b) are such a compact acceleration sensor structure having the better temperature characteristic and the self-diagnose function.

Embodiment 4

Figure 7A:
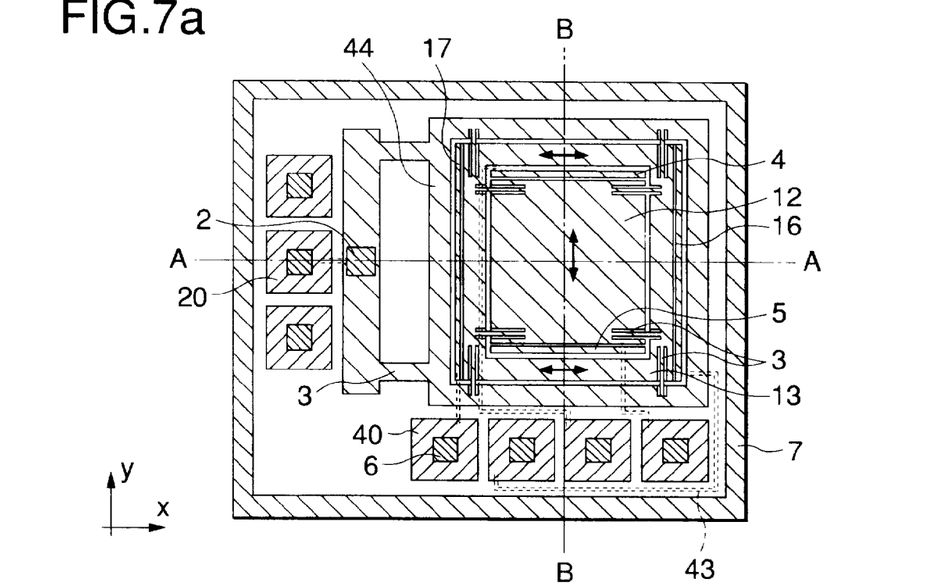
FIGS. 7(a)–7(c) are structural diagrams for indicating a structure of a multi-axis acceleration sensor according to an embodiment 4 of the present invention.
Figure 7B:
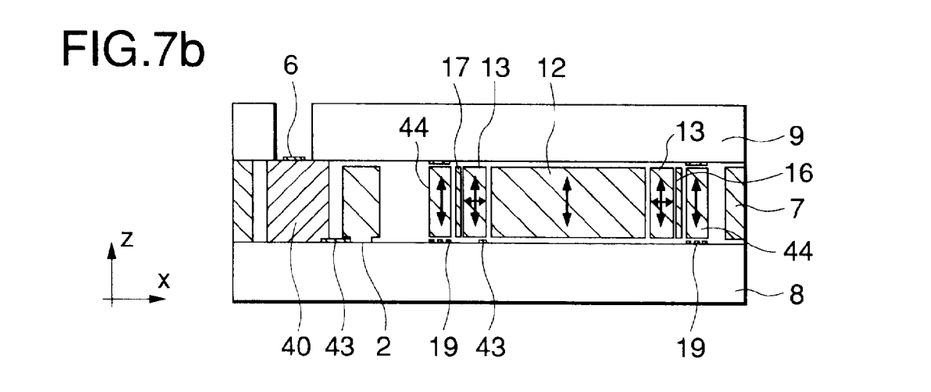
Figure 7C:
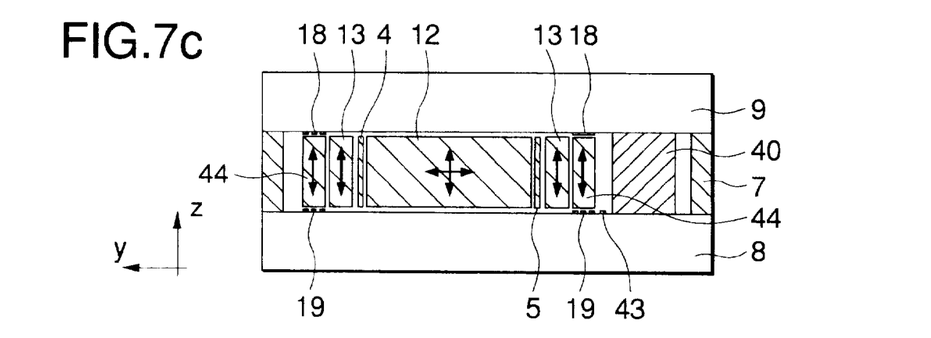

FIGS. 7(a)–7(c) are a structural diagram for representing a structure of a multi-axis acceleration sensor according to an embodiment 4 of the present invention. In this drawing, FIG. 7(a) is such a plan view from which the glass substrate b9 is removed, FIG. 7(b) is a sectional view, taken along a line A—A of the above-described plan view FIG. 7(a), and FIG. 7(c) is a sectional view, taken along a line B—B of the above-described plan view FIG. 7(a). In the sensor structures according to the embodiments 1 to 3, the acceleration along the 2-axis detecting directions within the plane is measured by the separate mass bodies. The acceleration sensor indicated in FIGS. 7(a)–7(c) are featured by that the acceleration measurement of 2-axis detecting directions within the plane is performed to the same mass body. That is, a mass body a12 is held on another mass body b13 by way of a beam 3. A length, a thickness, and a width of this beam 3 are controlled in order that this beam 3 is displaced only in response to the acceleration along the y-axis direction, but is not displaced in response to the acceleration along the x-axis and z-axis directions. A fixed electrode 4 and another fixed electrode b5, which constitute acceleration detecting electrodes, are formed a surface of the mass body 12 located opposite to the y-axis direction, while a constant space is defined. The mass body 13 formed in such a manner that the mass body 12 is surrounded is held on a mass body c44 by way of the beam 3. The length, thickness and width of this beam structure are controlled in such a way that this mass body 13 is deformed in response to only the acceleration along the x-axis direction, but is not deformed in response to the acceleration along the y-axis and z-axis directions. A fixed electrode c16 and another fixed electrode d17 are formed on a surface of the mass body 13 located opposite to the x-axis direction as the acceleration detecting electrodes, while a constant space is defined. The mass body c44 is supported by two beams 3 and fixed by the anchor portion 2 as shown in FIGS. 7(a)–7(c). A length, a thickness, and a width of a beam structure for supporting this mass body c44 are controlled in such a way that this beam structure is deformed in response to only the acceleration along the z-axis direction, but is not deformed in response to the acceleration along the y-axis and x-axis directions. A fixed electrode 18 and another fixed electrode 19 are formed on a surface of the mass body c44 located opposite to the z-axis direction as the acceleration detecting electrodes, while a constant space is defined. The respective fixed electrodes are electrically connected to an island electrode 40 by using the underlayer metal wiring line 43 and the like.

When the acceleration is applied along the y-axis direction, only the mass body 12 is moved, and an electric capacitance between the fixed electrode 4 and an intermediate electrode a20, and also another electric capacitance between the fixed electrode b5 and this intermediate electrode a20 are changed, so that the acceleration along the y-axis direction can be detected. Since both the mass body 13 and the mass body c44 are not displaced in response to the acceleration along the y-axis direction, the electric capacitance between another fixed electrode and the intermediate electrode a20 is not changed.

When the acceleration is applied along the x-axis direction, both the mass body 12 and the mass body 13 are moved along the x-axis direction, and the capacitance between the fixed electrode c16 and the immediate electrode a20, and also the capacitance between the fixed electrode d17 and the immediate electrode a20 are changed, so that the acceleration along the x-axis direction can be detected. The mass body 12 is not displaced in the y-axis direction by the acceleration along the x-axis direction, but also the mass body c44 is not completely displaced. When the electrode lengths of the fixed electrode 4 and the fixed electrode b5 are made equal to the electrode length of the mass body 12, the capacitance between the fixed electrode 4 and the intermediate electrode a20, and also the capacitance between the fixed electrode b5 and the intermediate electrode a20 are equal to each other and are decreased by receiving the acceleration along the y-axis direction. However, since these capacitance changes are canceled in the detecting circuit, the acceleration component along the y-axis direction is not detected. When the electrode lengths of the fixed electrode 4 and the fixed electrode b5 are made slightly longer, or slightly shorter than the electrode length of the mass body 12, there is no change in the capacitance between the fixed electrode 4 and the intermediate electrode a20, and also in the capacitance between the fixed electrode b5 and the intermediate electrode a20 with respect to the acceleration along the x-axis direction.

When the acceleration is applied along the z-axis direction, both the mass body 12, the mass body 13, and the mass body c44 are moved along the z-axis direction, and the capacitance between the fixed electrode 18 and the immediate electrode a20, and also the capacitance between the fixed electrode 19 and the immediate electrode a20 are changed, so that the acceleration along the z-axis direction can be detected. The mass body 12 and the mass body 13 are not displaced by the acceleration along the z-axis direction in the x-axis and y-axis directions. The capacitance between the fixed electrode 4 and the intermediate electrode a20, and also the capacitance between the fixed electrode b5 and the intermediate electrode a20 are equal to each other and are decreased by receiving the acceleration along the z-axis direction. However, since these capacitance changes are canceled in the detecting circuit, the acceleration component along the y-axis direction is not detected. Similarly, although the capacitance between the fixed electrode c16 and the intermediate electrode a20, and the capacitance between the fixed electrode d17 and the intermediate electrode a20 are made equal to each other and are decreased, since the capacitance changes are canceled in the detecting circuit, no acceleration along the x-axis direction is detected.

As to the beam structures shown in FIGS. 7(a)–7(c), there are provided the four beam structures for detecting the acceleration direction within the plane, and the two beam structures for detecting the acceleration direction outside the plane. Alternatively, more than one beam structure may be employed. It should also be noted that the beam structures for the respective axes should be arranged not to receive the adverse influences caused by the vibrations of the respective axes. That is, the structures, the lengths, the widths, and the thicknesses of the beams for the respective axes are controlled so as to shift the resonant frequencies. Thus, no adverse influences are given to other axes.

FIGS. 7(a)–7(c), there is shown an example of the 3-axis acceleration sensor. Alternatively, when only the two-axis acceleration within the plane is required to be detected, the resulting sensor structure is made by omitting the mass body "c" and the beam 3 for supporting this mass body "c". Although the acceleration along the detecting direction outside the plane is detected by the mass body c44 arranged at the outside in FIGS. 7(a)–7(c), the acceleration detecting structure along the detecting direction outside the plane may be arranged at the innermost side of the mass body.

A method for manufacturing the sensor structure indicated in FIGS. 7(a)–7(c) may be realized by using the manufacturing method of the embodiment 1 shown in FIG. 3(a)–3(e). As previously described, in accordance with the sensor structure of FIGS. 6(a)–6(c), since the beams and the mass body structures displaced along the respective axes are provided within a single mass body, the 3 axial acceleration can be detected. The chip area of this sensor structure can be considerably reduced, as compared with the chip areas of the sensor structures shown in the embodiment 1 to 3. It is possible to provide either the 2-axis, or the 3-axis acceleration sensor manufactured in low cost and in a compact body.

Embodiment 5

Figure 8A:
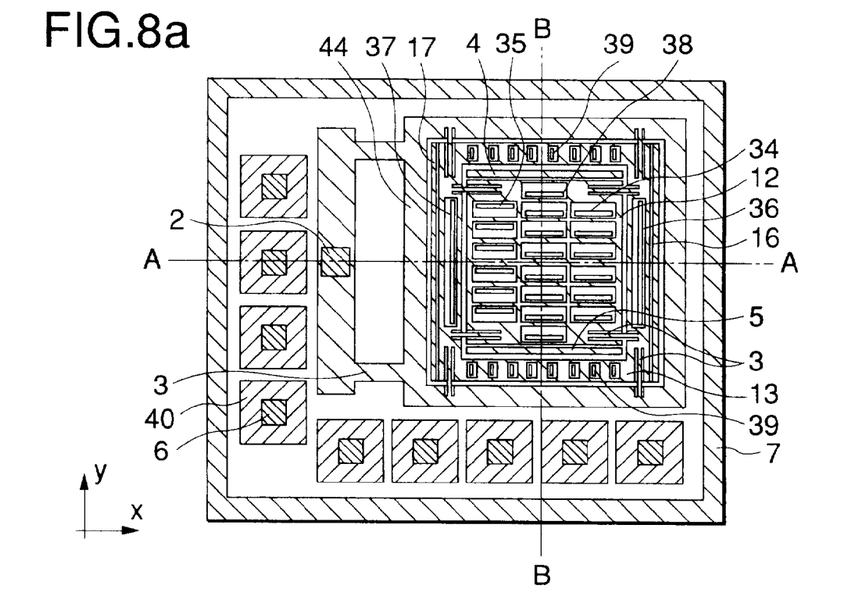
FIGS. 8(a)–8(c) are structural diagrams for indicating a structure of a multi-axis acceleration sensor according to an embodiment 5 of the present invention.
Figure 8B:
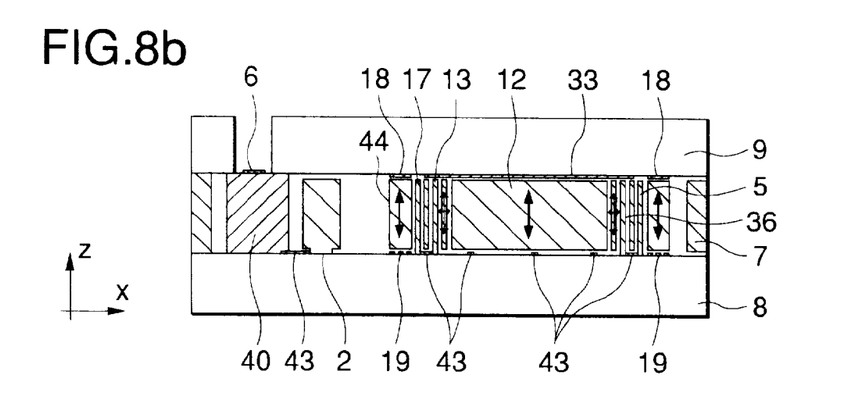
Figure 8C:
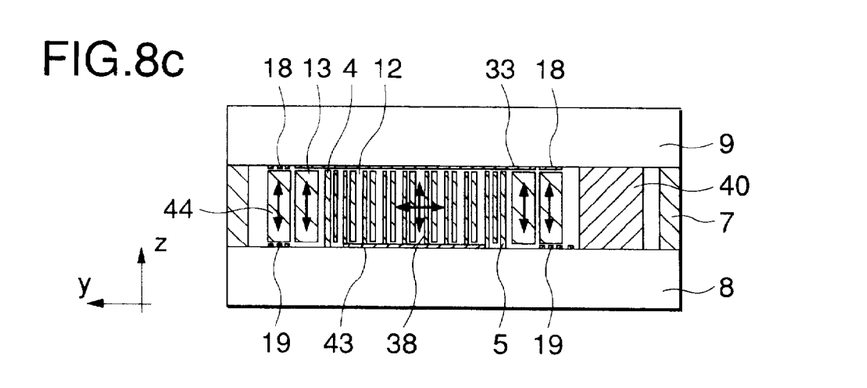

FIGS. 8(a)–8(c) are a structural diagram for representing a structure of a multi-axis acceleration sensor according to an embodiment 5 of the present invention. In this drawing, a plan view (a) is such a plan view from which the glass substrate b9 is removed. A sensor structure of FIGS. 8(a)–8(c) are featured by that in the embodiment 4, the sensor structure shown in FIGS. 7(a)–7(c) is made with the buried electrode of the embodiment 3 shown in FIGS. 6(a)–6(c). The buried electrode a54 the buried electrode b35, and the actuation buried electrode a38 are formed within the mass body 12. Similarly, the buried electrode c36, the buried electrode d37, and the actuation buried electrode 39 are formed within the mass body 13. The respective buried electrodes are jointed to the glass substrate a8, and is electrically connected thereto by the underlayer metal wiring line 43 formed on the glass substrate a8. The buried electrode a34 is electrically connected to the fixed electrode 4 by the underlayer metal wiring line 43. The buried electrode b35 is electrically connected to the fixed electrode b5 by the underlayer metal wiring line 43. The c36 is electrically connected to the fixed electrode c6. The buried electrode d37 is electrically connected to the fixed electrode d7. The actuation buried electrodes 39 and 40 are electrically connected to one of the island electrodes 40 by the underlayer metal wiring line 43, respectively. As to the buried electrode structures, two sets of buried electrodes may be provided within a single slit shown in FIG. 6(c) in the embodiment 3.

As represented in the embodiment 3, the superior temperature characteristic can be realized by employing the buried electrodes, and also the S/N ratio can be realized by increasing the detecting capacitance. Furthermore, the actuation self-diagnose function along the x-axis and y-axis directions can be realized. The sensor structure shown in FIGS. 8(a)–8(c) are such a compact and high-reliable sensor structure with the better temperature characteristic.

In accordance with the multi-axis acceleration sensor of the present invention, the mass bodies are supported by at least two sets of cantilever beams arranged parallel to each other and for holding the mass bodies in such a manner that the vibration forms of the mass bodies along the wafer plane direction are defined to the parallel movement. Accordingly, as to the movement along the plane direction, the space between the fixed electrode is controlled so as to be uniformly changed, and the acceleration can be detected in high precision. When this multi-axis acceleration sensor is used to detect the acceleration along the 3-axial directions, the mass bodies are moved in parallel to each other within the X-Y plane, whereas these mass bodies are displaced along the z direction with allowing the bending deformation. As a result, the acceleration along the z direction can be detected. In this manner, this sensor can sense the acceleration along the 3-axial direction in high precision.

Also, in accordance with the multi-axis acceleration sensor related to the seventh structure of the present invention, the self-diagnose by the acceleration sensor can be executed, so that the highly reliable multi-axis acceleration sensor can be obtained.

Also, in accordance with the multi-axis acceleration sensors related to the eighth and ninth structures of the present invention the electric capacitance for detecting the displacement, or the actuation can be made large, so that the highly reliable multi-axis acceleration sensor with the high precision can be obtained.

Also, in accordance with the multi-axis acceleration sensor related to the tenth structure of the present invention, the compact and highly reliable multi-axis acceleration sensor can be obtained in low cost.

What is claimed is:

1. A multi-axis acceleration sensor for detecting acceleration along directions of plural axes comprising:

at least one mass body made of a single crystal silicon wafer and arranged on a plane of said silicon wafer;

at least two cantilever beams arranged in parallel to each other capable of displacing said mass body along a plurality of directions and of holding said mass body in such a manner that direction of displacement of said mass body is defined to be parallel with respect to the plane of said wafer and one end of each of said cantilever beams, said one end being connected with respective end of said mass body and another end of each of said cantilever beams being supported by a supporting unit;

at least one fixed electrode which is electrically insulated from said cantilever beams and said mass body and is arranged each direction, opposite to each other via a constant space every acceleration detecting direction of said mass body so as to detect displacement of said mass body caused by the acceleration along the plural directions; and displacement detecting means for detecting the displacement of said mass body by applying a constant voltage between said fixed electrode and said mass body, wherein:

said multi-axis acceleration sensor includes a mass body "a" displaced with respect to one axis within the wafer plane, and a beam structure holding this mass body "a"; an edge portion of this beam structure is connected to a mass body "b" formed at a peripheral portion of said mass body "a"; the beam structure for holding the mass body "b" owns such a structure that said beam structure is displaced perpendicular to a displacement direction of said mass body "a"; more than one fixed electrodes are provided via a constant space and positioned opposite to the acceleration detecting directions within the wafer plane of the respective mass bodies; and the respective fixed electrodes are electrically insulated from the beam and the mass bodies to thereby detect the acceleration of two axes along the detecting directions within the wafer plane.

2. A multi-axis acceleration sensor for detecting acceleration along directions of plural axes, comprising:

at least one mass body made of a single crystal silicon wafer and arranged on a plane of said silicon wafer;

at least two cantilever beams arranged in parallel to each other, capable of displacing said mass body along a plurality of directions and of holding said mass body in such a manner that direction of displacement of said mass body is defined to be parallel with respect to the plane of said wafer and one end of each of said cantilever beams, said one end being connected with respective end of said mass body and another end of each of said cantilever beams being supported by a supporting unit;

at least one fixed electrode which is electrically insulated from said cantilever beams and said mass body, and is arranged each direction opposite to each other via a constant space every acceleration detecting direction of said mass body so as to detect displacement of said mass body caused by the acceleration along the plural directions; and displacement detecting means for detecting the displacement of said mass body by applying a constant voltage between said fixed electrode and said mass body, wherein:

said multi-axis acceleration sensor includes a mass body "a" displaced with respect to one axis within the wafer plane, and a beam structure holding this mass body "a"; an edge portion of this beam structure is connected to a mass body "b" formed at a peripheral portion of said mass body "a"; the beam structure for holding the mass body "b" owns such a structure that said beam structure is displaced perpendicular to a displacement direction of said mass body "a"; an edge portion of a beam of said mass body "b" is connected to a mass body "c" formed at a peripheral portion of the mass body "b"; a beam structure for holding the mass body "c" owns a structure displaced along the detecting direction outside the plane; more than one fixed electrodes are provided via a constant space and positioned opposite to the acceleration detecting directions within the wafer plane of the respective mass bodies; and the respective fixed electrodes are electrically insulated from the beam and the mass bodies to thereby detect the acceleration of two axes along the detecting directions within the wafer plane, and also one axis along the detecting direction outside the wafer plane.

3. A multi-axis acceleration sensor for detecting acceleration along directions of plural axes comprising:

at least one mass body made of a single crystal silicon wafer and arranged on a plane of said silicon wafer;

at least two cantilever beams arranged in parallel to each other, capable of displacing said mass body along a plurality of directions and of holding said mass body in such a manner that direction of displacement of said mass body is defined to be parallel with respect to the plane of said wafer and one end of each of said cantilever beams, said one end being connected with respective end of said mass body and another end of each of said cantilever beams being supported by a supporting unit;

at least one fixed electrode which is electrically insulated from said cantilever beams and said mass body, and is arranged each direction opposite to each other via a constant space every acceleration detecting direction of said mass body so as to detect displacement of said mass body caused by the acceleration along the plural directions; and displacement detecting means for detecting the displacement of said mass body by applying a constant voltage between said fixed electrode and said mass body, wherein:

said multi-axis acceleration sensor includes a mass body "a" displaced with respect to one axis outside the wafer plane, and a beam structure holding this mass body "a"; an edge portion of this beam structure is connected to a mass body "b" formed at a peripheral portion of said mass body "a"; a beam structure for holding a mass body "b" is such a structure displaced with respect to one axis within the wafer plane, a beam edge portion of the mass body "b" is connected to a mass body "c" formed at a peripheral portion of the mass body "b"; a beam structure for holding the mass body "c" owns such a displacement structure positioned perpendicular to the displacement direction of the mass body "b" within the wafer plane; more than one fixed electrodes are provided via a constant space and positioned opposite to the acceleration detecting directions within the wafer plane of the respective mass bodies; and the respective fixed electrodes are electrically insulated from the beam and the mass bodies to thereby detect the acceleration of two axes along the detecting directions within the wafer plane, and also the acceleration of one axis along the detecting direction outside the wafer plane.

4. The multi-axis acceleration sensor as claimed in claim 1, further comprising at least one self-diagnostic actuation electrode for performing self-diagnose of sensitivity of the sensor.

5. The multi-axis acceleration sensor of claim 4, wherein two self-diagnostic actuation electrodes are provided for performing self-diagnose along two directions.

6. The multi-axis acceleration sensor of claim 4, wherein three self-diagnostic actuation electrodes are provided for performing self-diagnose along three directions.

7. The multi-axis acceleration sensor as claimed in claim 2, further comprising at least one self-diagnostic actuation electrode for performing self-diagnose of sensitivity of the sensor.

8. The multi-axis acceleration sensor of claim 7, wherein two self-diagnostic actuation electrodes are provided for performing self-diagnose along two directions.

9. The multi-axis acceleration sensor of claim 7, wherein three self-diagnostic actuation electrodes are provided for performing self-diagnose along three directions.

10. The multi-axis acceleration sensor as claimed in claim 3, further comprising at least one self-diagnostic actuation electrode for performing self-diagnose of sensitivity of the sensor.

11. The multi-axis acceleration sensor of claim 10, wherein two self-diagnostic actuation electrodes are provided for performing self-diagnose along two directions.

12. The multi-axis acceleration sensor of claim 10, wherein three self-diagnostic actuation electrodes are provided for performing self-diagnose along three directions.

* * * * *